US 012554558B2

(12) United States Patent
Griffin et al.

(10) Patent No.: US 12,554,558 B2
(45) Date of Patent: Feb. 17, 2026

(54) SEPARATING APPLICATION PROGRAMMING INTERFACES INTO CONTAINERS TO FACILITATE SAFETY ASSURANCE

(71) Applicant: RED HAT, INC., Raleigh, NC (US)

(72) Inventors: Leigh Griffin, Waterford (IE); Pierre-Yves Chibon, Saint Pol-de-Leon (FR)

(73) Assignee: Red Hat, Inc., Raleigh, NC (US)

( * ) Notice: Subject to any disclaimer, the term of this patent is extended or adjusted under 35 U.S.C. 154(b) by 247 days.

(21) Appl. No.: 18/225,746

(22) Filed: Jul. 25, 2023

(65) Prior Publication Data

US 2025/0036489 A1 Jan. 30, 2025

(51) Int. Cl.
  *G06F 9/54* (2006.01)
  *G06F 8/71* (2018.01)
  *G06Q 50/26* (2024.01)

(52) U.S. Cl.
  CPC .............. *G06F 9/541* (2013.01); *G06F 8/71* (2013.01); *G06Q 50/265* (2013.01)

(58) Field of Classification Search
  CPC .......... G06F 8/71; G06F 9/541; G06Q 50/265
  See application file for complete search history.

(56) References Cited

U.S. PATENT DOCUMENTS

| 10,073,974 | B2 * | 9/2018 | Hwang | G06F 8/71 |
| 10,481,898 | B2 * | 11/2019 | Advani | G06F 8/38 |
| 11,106,451 | B2 * | 8/2021 | Advani | G06F 8/71 |
| 11,233,814 | B2 * | 1/2022 | Ramasamy | H04L 63/10 |
| 11,301,357 | B1 * | 4/2022 | Gacek | G06F 11/323 |
| 11,347,865 | B2 * | 5/2022 | Boulton | G06F 21/552 |
| 2019/0213326 | A1 * | 7/2019 | Dykes | G06F 21/552 |
| 2019/0251013 | A1 * | 8/2019 | Agarwal | G06F 11/3604 |
| 2022/0210194 | A1 * | 6/2022 | Parekh | H04L 67/10 |

(Continued)

OTHER PUBLICATIONS

Grosse et al., "Planning Software Architecture and Modeling Patterns for ISO 26262 Compliance", https://www.mathworks.com/content/dam/mathworks/conference-or-academic-paper/planning-software-architecture-modeling-patterns-iso-26262-compliance.pdf, 2020; pp. 1-6.

(Continued)

*Primary Examiner* — Douglas M Slachta
(74) *Attorney, Agent, or Firm* — Kilpatrick Townsend & Stockton LLP (57) ABSTRACT

Application programming interfaces (APIs) of a software package can be separated into containers to facilitate safety assurance through isolation. For example, a computing system can receive an application request associated with the software package. The software package can include a first set of APIs that is compliant with a safety threshold and a second set of APIs that is noncompliant with the safety threshold. The computing system can determine that the application request corresponds to the first set of APIs. In response, the computing system can identify a first container that includes a first instance of the software package in which the first set of APIs is enabled and the second set of APIs is disabled. Subsequent to identifying the first container, the computing system can forward the application request to the first container that can handle the application request using the first instance of the software package.

20 Claims, 4 Drawing Sheets

(56) References Cited

U.S. PATENT DOCUMENTS

2022/0294818 A1* 9/2022 Parekh .................. G06F 21/602
2022/0374218 A1* 11/2022 Monteiro Vieira ....... G06F 8/63
2024/0414203 A1* 12/2024 Lande Blau ........ G06F 9/45558
2025/0036401 A1* 1/2025 Ross ........................ G06F 8/71

OTHER PUBLICATIONS

Mizuyama et al., "Device Virtualization Architecture for Automotive", https://automotivelinux.org/wp-content/uploads/sites/Apr. 2020/11/agl_webinar20201113_mizuyama.pdf, Nov. 2020; pp. 1-29.

Morra, James, "Arm Rolls Out Tools to Usher in Software-Upgradeable Cars", https:/www.electronicdesign.com/markets/automotive/article/21175494/electronic-design-arm-rolls-out-tools-to-usher-in-softwareupgradeable-cars, Sep. 17, 2021; pp. 1-15.

"Overview of Functional Safety Measures in AutoSAR", https://www.autosar.org/fileadmin/user_upload/standards/classic/4-3/autosar_exp_functionalsafetymeasures.

* cited by examiner

SEPARATING APPLICATION PROGRAMMING INTERFACES INTO CONTAINERS TO FACILITATE SAFETY ASSURANCE

TECHNICAL FIELD

The present disclosure relates generally to software deployment and evaluation. More specifically, but not by way of limitation, this disclosure relates to separating application programming interfaces (APIs) into containers to facilitate safety assurance.

BACKGROUND

Many organizations around the globe have developed functional safety standards for software and electronics. Functional safety relates to reducing risks so that computing systems function safely in the event that there is a malfunction. One example of a functional safety standard is ISO 26262 for automotive electronics. Functional safety standards can be used to avoid or mitigate systematic failures and hardware failures to prevent hazardous operational situations. A software package can be certified to a functional safety standard based on a target level of risk reduction. For example, an Automotive Safety Integrity Level (ASIL) assignment with respect to ISO 26262 has four possible levels of safety requirements: ASIL A, ASIL B, ASIL C, and ASIL D. ASIL D has the highest safety requirements of the four possible levels and includes the safety requirements of the three preceding levels.

Such software packages can be deployed inside containers within a computing environment. A container is a relatively isolated virtual environment created by leveraging the resource isolation features (e.g., cgroups and namespaces) of the Linux Kernel. Deploying software services inside containers can help isolate the software services from one another, which can improve speed and security and provide other benefits. The software services may include feature flags to enable or disable certain aspects of the software services without modifying source code or requiring a redeploy. Feature flags may be referred to as feature gates, feature toggles, or feature switches.

DETAILED DESCRIPTION

A software developer or software development organization may want or need to comply with a functional safety standard issued by a standard-setting organization when developing a software package for end users. A software package can include programs and files that are bundled together to serve a common purpose. The software package can include more than one application programming interface (API), where each API may correspond to a different classification of safety assurance. In some cases, an API in a software package may interfere with another API in the software package. For example, there may be conflicts associated with resource consumption, task scheduling or execution, communication, or any combination of these between the APIs. When such interference is between APIs that correspond to different classifications of safety assurance, it can cause unpredictable behavior (e.g., failures, malfunctions, etc.) associated with the software package. As one particular example, if the software package is associated with an automotive system, interference between the APIs may cause brake failure in response to an air conditioning system being activated and interfering with a brake pressure sensor.

Some examples of the present disclosure can overcome one or more of the issues mentioned above by using one or more containers to deploy different instances of the software package to ensure safety assurance with respect to a safety threshold. The different instances of the software package can correspond to a respective set of APIs that can be defined or classified with respect to the safety threshold. APIs of the software package can be sorted or separated into individual sets of APIs based on different levels of safety assurance, whether the APIs comply with the safety threshold, or a combination of these. As an example, two containers may each deploy a different instance of the software package that is either compliant with or noncompliant with the safety threshold. Thus, each container can isolate a respective set of APIs being executed in a corresponding instance of the software package, thereby minimizing a likelihood of interference among the sets of APIs. Additionally, using the containers to separate the sets of APIs can create lighter loads while enabling customized security measures based on whether each container is compliant with or noncompliant with the safety threshold.

In some examples, a computing system may handle an application request using a particular container selected from one or more containers of the computing system based on safety assurance associated with the application request. The computing system can initiate the containers to each run a different instance of a software package used to handle the application request. A code base of the software package can include one or more APIs that may correspond to varying levels of safety assurance. Using the containers can enable a separation of concerns to avoid or minimize a potential for cross-communication with respect to APIs corresponding to different levels of safety assurance.

To determine how to deploy the APIs of the software package among the multiple containers, the computing system can analyze the APIs to determine the appropriate safety level for each API. The computer system can then group the APIs with the same or similar safety levels into safety level groups. After grouping the APIs, the computer system can generate a respective container for each respective safety level group and deploy the corresponding APIs within those containers. The computing system can then route incoming requests among the containers based on the safety level associated with the incoming request, so that an incoming request is matched to whichever container corresponds to its safety level.

More specifically, the computing system can use each container to deploy a different instance of the software package based on a respective level of safety assurance associated with each container. For instance, each instance of the software package may include the same code base but have different feature flags enabled. By setting the feature flags, the APIs that are running in a given container can be selectively activated or deactivated. The feature flags that are set for a given instance of the software package can be chosen based on the level of safety assurance for the corresponding container that is running the instance of the software package. The feature flags can be adjusted to activate or deactivate certain of APIs associated with an instance of the software package, while avoiding redeployment of the software package, thereby conserving computing resources. Additionally, using the feature flags to customize each instance of the software package can enable customizability while minimizing extraneous files used to implement the different instances of the software package. Minimizing extraneous files associated with different instances of the software package can decrease security risk associated with the software package by minimizing an attack surface of the software package.

In one particular example, a computing device can execute a rule engine to determine that a code base of a software package includes three sets of APIs that each correspond to a different ASIL classification. Each set of APIs may include one or more APIs of the codebase of the software package. The code base can represent a collection of source code used to build the software package. As an example, a first set of APIs can correspond to an ASIL D classification, a second set of APIs can correspond to an ASIL B classification, and a third set of APIs can correspond to an ASIL A classification. Based on a safety threshold of the software package, the computing device may determine that ASIL classifications at or above ASIL C is compliant with the safety threshold.

Next, the computing device can initiate two containers such that a first container is compliant with the safety threshold and that a second container is noncompliant with the safety threshold. The first container can run a first instance of the software package that is compliant with the ASIL D classification by enabling the first set of APIs and disabling the second set of APIs and third set of APIs. Thus, the first instance of the software package can be ensured to comply with the ASIL D classification corresponding to the first set of APIs, thereby being compliant with the safety threshold. Similarly, the second container can run a second instance of the software package that enables the second set of APIs and the third set of APIs while disabling the first set of APIs. This can ensure isolation of the first set of APIs from the second set of APIs and the third set of APIs, thereby preventing hazardous interference from the second set of APIs and third set of APIs that are noncompliant with the safety threshold.

After executing the rule engine to classify the three sets of APIs, the computing device may generate a lookup table that indicates which ASIL classification corresponds to each set of APIs. When the computing device receives an application request associated with the software package, the computing device can use the lookup table to determine which of the two containers is suitable to handle the application request. If, for example, the computing device determines that the first container is suitable to handle the application request, the computing device can forward the application request to the first container, and not the second container, to handle the application request using the first instance of the software package.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
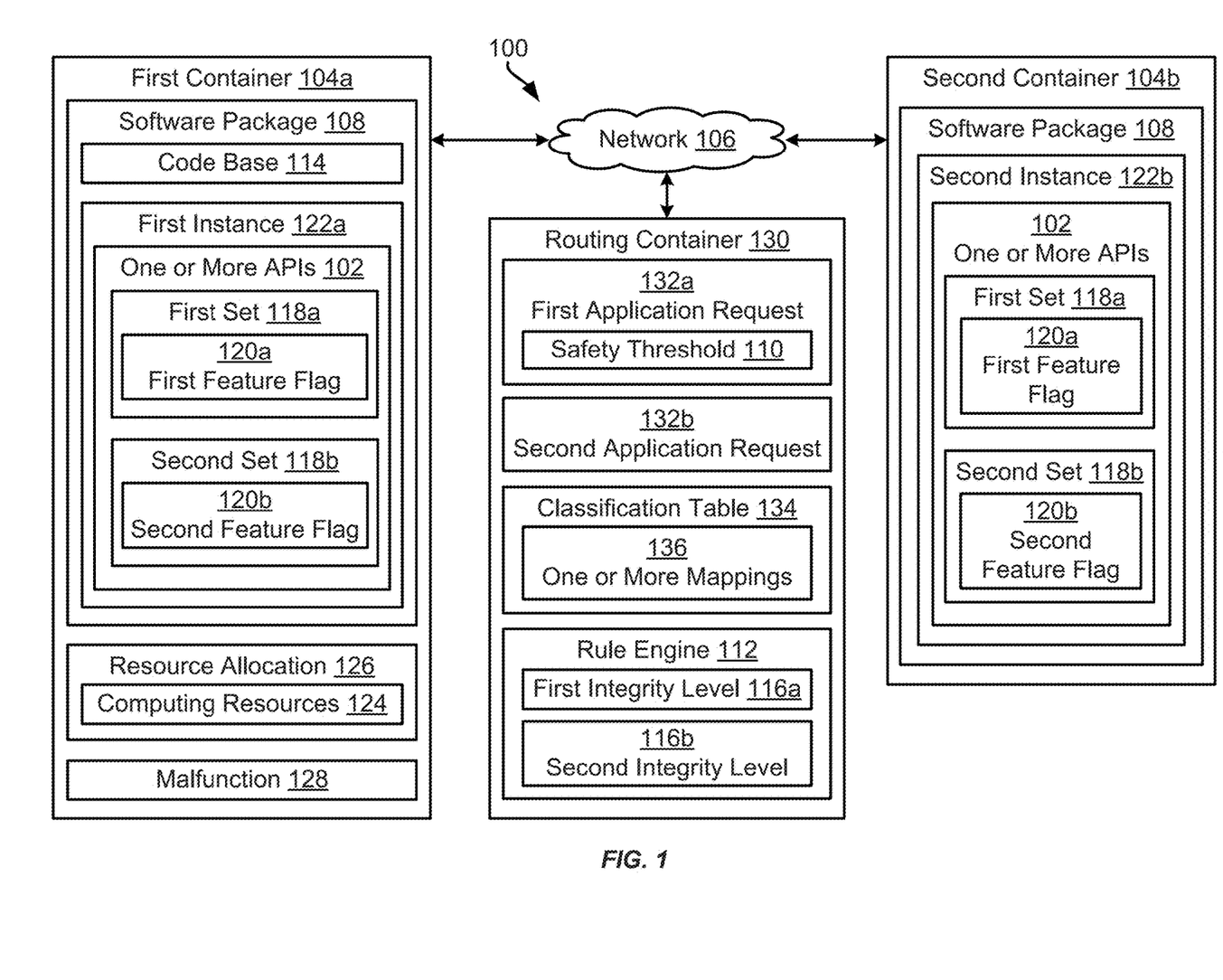
FIG. 1 is a block diagram of an example of a computing environment for separating application programming interfaces (APIs) into containers to facilitate safety assurance according to some aspects of the present disclosure.

FIG. 1 is a block diagram of an example of a computing environment 100 for separating APIs 102 into containers 104 to facilitate safety assurance according to one example of the present disclosure. Examples of the computing environment 100 can include a desktop computer, laptop computer, server, mobile phone, or tablet. Components within the computing environment 100 may be communicatively coupled via a network 106, such as a local area network (LAN), wide area network (WAN), the Internet, or any combination thereof. For example, the computing environment 100 can include one or more containers 104a-b that are communicatively coupled through the network 106. Additionally or alternatively, other suitable virtualization techniques may be used instead of or in addition to the containers 104a-b. For example, the computing environment 100 may include one or more virtual machines communicatively coupled through the network 106. In some implementations, a combination of containers 104a-b and virtual machines may be running in the computing environment 100 to isolate different instances of a software package 108 as described herein.

The software package 108 can include one or more application programming interfaces (APIs) 102 that can be associated with a safety threshold 110 of the software package 108. The APIs can represent a set of definitions or protocols used to build or integrate application software associated with the software package 108. The safety threshold 110 can correspond to safety assurance of the software package 108, for example with respect to attaining a functional safety certification of the software package 108. The functional safety certification can represent an attestation or confirmation with respect to the software package 108 conforming to one or more safety standards. The functional safety certification may be overseen by a regulatory authority (e.g., International Organization for Standardization (ISO), International Electrotechnical Commission (IEC), etc.). In some examples, the functional safety certification of the software package 108 can be associated with vehicles, machinery, software, or devices (e.g., in transportation, construction, or medical applications). Additionally, compliance-related policies (e.g., the Health Insurance Portability and Accountability Act (HIPAA), etc.) may involve a similar certification or assurance with respect to safety.

The APIs 102 of the software package 108 can be classified based on the safety threshold 110 of the software package 108. In some examples, a rule engine 112 can be executed to classify the APIs 102 of the software package 108 based on safety assurance, for example with respect to the functional safety certification. In some implementations, the rule engine 112 can be stored in the computing environment 100. Alternatively, the rule engine 112 may be positioned external to the computing environment 100, for example in a client device. The rule engine 112 can include at least one rule set used to classify the APIs, for example based on whether each API of the APIs 102 is compliant with or noncompliant with the safety threshold 110.

The rule engine 112 may use a code base 114 of the software package 108 as an input to classify the APIs 102 based on the at least one rule set. For example, the rule engine 112 may identify the APIs 102 based on being associated with linkage during compilation, interrupt request (IRQ) handlers, exception handlers, or defining API calls. Once the rule engine 112 identifies the APIs 102, the computing environment 100 can tag each API of the APIs 102 with an identifier indicating a classification with respect to the safety threshold 110. In some examples, the computing environment 100 may indicate the identifier of the APIs 102 in a configuration file associated with the code base 114 of the software package 108. Additionally or alternatively, the computing environment 100 may define the identifier in metadata (e.g., using annotations, comments, etc.) within the code base 114.

In some examples, the APIs 102 can be classified using an integrity level 116 selected from one or more integrity levels 116a-b that have varying rigor associated with safety assurance of the software package 108. For example, if the functional safety certification of the software package corresponds to ISO 26262, a first set 118a of APIs 102 can be classified using a first integrity level 116a of ASIL D. A second set 118b of APIs 102 can be classified using a second integrity level 116b of ASIL B. As used herein, a "set" of APIs may include one or more APIs. The first integrity level 116a may build upon the second integrity level 116b such that the first integrity level 116a includes additional safety requirements that improve upon the safety assurance of the software package 108. In some cases, the APIs 102 of the software package 108 may correspond to more than two integrity levels 116a-b. As an example, certain APIs of the software package 108 may correspond to ASIL A, ASIL B, or ASIL D. In some such examples, the APIs 102 of the software package 108 can be tagged based on the corresponding integrity level, creating a separate set of APIs 102 associated with each integrity level 116.

In some examples, the safety threshold 110 of the software package 108 may correspond to a specific integrity level. For example, the specific integrity level of the safety threshold 110 may be ASIL C. Accordingly, the first set 118a of APIs 102 can be compliant with the safety threshold 110 due to being classified using the first integrity level 116a of ASIL D that is associated with higher safety assurance compared to ASIL C. In contrast, the second set 118b of APIs 102 may be noncompliant with the safety threshold 110 due to being classified using the second integrity level 116b of ASIL B that is associated with lower safety assurance compared to ASIL C.

Once the APIs 102 of the software package 108 are classified into separate sets of APIs 102, the computing environment 100 can determine whether the sets 118a-b of APIs 102 are compliant or noncompliant with the safety threshold 110. A set 118 of APIs 102 being compliant with the safety threshold 110 can indicate that the set 118 of APIs 102 is in accordance with safety requirements associated with the safety threshold 110. For example, the safety threshold 110 may be assigned to prevent interference among the APIs 102 of the software package 108. Examples of the APIs 102 interfering with each other may include spatial interference, temporal interference, or communication interference. Spatial interference can involve memory interference, for example in which one API of the APIs 102 may corrupt or overwrite data associated with another API of the APIs 102. Another example of memory interference can involve a lack of synchronization between one API of the APIs 102 that generates or stores data and another API of the APIs 102 that consumes the data.

Temporal interference can include scheduling or execution interference, for example associated with conflicting use of a shared processing element. As an example, an API of the APIs 102 that is associated with a first process may consume computing resources 124 (e.g., storage, CPU, etc.) and prevent another API of the APIs 102 from executing a second process. Accordingly, temporal interference may cause deadlocks, livelocks, or otherwise block execution of tasks or processes. Communication interference can involve errors during an exchange of information between different APIs of the APIs 102. For example, one API of the APIs 102 may block access to a communication channel used by another API of the APIs 102 to receive critical information (e.g., brake fluid being below a predefined threshold).

In some examples in which the APIs 102 are classified using integrity levels 116a-b, the safety threshold 110 can correspond to a particular integrity level. For example, if the first set 118a of APIs 102 is associated with a first integrity level 116a of ASIL D, the first set 118a can be compliant with a safety threshold 110 associated with a particular integrity level of ASIL D or below (e.g., ASIL C, ASIL B, or ASIL A). The particular integrity level of the safety threshold 110 can represent a degree to which the software package 108 is assured with respect to safety. In some examples, the first set 118a of APIs 102 may be compliant with the safety threshold 110, while the second set 118b of APIs 102 may be noncompliant with the safety threshold 110. As another example, the first set 118a and the second set 118b may both be compliant with or noncompliant with the safety threshold 110.

Additionally, the sets 118a-b of APIs 102 can be assigned a feature flag 120 that can be used to modify a status of the sets 118a-b of APIs 102. For example, feature flags 120a-b may be used to adjust whether the sets 118a-b of APIs 102 are active or inactive. In some examples, the code base 114 of the software package 108 may include the feature flags 120a-b. As an example, the first set 118a of APIs 102 may be associated with a first feature flag 120a that can be modified to adjust whether the first set 118a of APIs 102 is active or inactive. Similarly, the status of the second set 118b of APIs 102 can be activated or deactivated using a second feature flag 120b. Accordingly, the feature flags 120a-b can be used to enable logical separation of the integrity levels 116a-b.

As depicted in FIG. 1, the containers 104a-b of the computing environment 100 can include a first container 104a and a second container 104b. The first container 104a can include a first instance 122a of the software package 108 that is compliant with the safety threshold 110. The second container 104b may execute a second instance 122b of the software package 108 that is noncompliant with the safety threshold 110. In other examples, the computing environment 100 may include more than two containers (e.g., three containers, four containers, etc.). In some implementations, each container 104 can run a different instance of the software package 108 to isolate the instances 122a-b of the software package 108. For example, the instances 122a-b of the software package 108 may each correspond to a respective integrity level of the software package 108. Isolating the instances 122a-b of the software package 108 can enable increased security and decreasing a likelihood of interference caused by different integrity levels of the APIs 102.

In some examples, the first container 104a may be configured with different settings than the second container 104b due to the first container 104a being compliant with the safety threshold 110. For example, to further improve data security, the first container 104a may include a different encryption technique than the second container 104*b*, enabling confidential computing capabilities with respect to provable security. As another example, the computing environment 100 may distribute computing resources 124 to the containers 104*a-b* based on whether the containers 104*a-b* are compliant with or noncompliant with the safety threshold 110. Examples of the computing resources 124 can include RAM, storage, central processing units (CPUs), virtual central processing units (vCPUs), or other suitable resources. In some examples in which the first container is compliant with the safety threshold 110, the computing environment 100 may manage a resource allocation 126 of the computing resources 124 to prevent a malfunction 128 of the first container 104*a*. The malfunction 128 (e.g., failure) may be caused by a lack or restriction of computing resources 124 associated with the first container 104*a*.

Additionally or alternatively, if the computing environment includes virtual machines, at least one of the virtual machines may run a different instance of the software package 108. For example, the computing environment 100 may implement a virtual machine in conjunction with the containers 104*a-b* to enable freedom from interference with respect to the safety assurance of the software package 108. As another example, the computing environment 100 may use the virtual machines instead of the containers 104*a-b* to isolate the instances 122*a-b* of the software package.

The instances 122*a-b* of the software package 108 can be created based on the safety assurance of the first set 118*a* and the second set 118*b* of APIs 102. For example, the first container 104*a* can run a first instance 122*a* of the software package 108 with the first set 118*a* of APIs 102 enabled and with the second set 118*b* of APIs 102 disabled. The first set 118*a* of APIs 102 can be enabled in the first instance 122*a* of the software package 108 using the first feature flag 120*a*. Similarly, the second container 104*b* can run a second instance 122*b* of the software package 108 with the first set 118*a* of APIs 102 disabled and with the second set 118*b* of APIs 102 enabled. Accordingly, the first instance 122*a* of the software package 108 can provide safety assurance with respect to the safety threshold 110 due to the first set 118*a* of APIs 102 being isolated in the first container 104*a*. Isolating the first instance 122*a* and second instance 122*b* of the software package 108 can enable the computing environment 100 to enforce freedom from interference, for example to avoid cascading failures resulting from cross-communication.

In some examples, the computing environment 100 can include a routing container 130 that can determine a suitable container, from among the deployed set of containers 104*a-b*, to handle application requests 132*a-b* associated with the software package 108. The routing container 130 may receive the application requests 132*a-b* generated by a client or other suitable entity and can use the application requests 132*a-b* to determine the suitable container to handle each of the application requests 132*a-b*. For example, an application request 132 can indicate which safety level should be used to handle the application request 132. The routing container 130 can match the application request 132 to a container that meets or exceeds the safety level required by the application request 132.

To determine which container should be used to handle the application request 132, the routing container 130 can maintain a classification table 134 that can include one or more mappings 136*a-b* associated with the containers 104*a-b*. In some examples, the classification table 134 may be a lookup table. Each mapping 136 can link one or more APIs with a corresponding container that is executing those API.

In some examples, each mapping 136 can link an integrity level to a container that is executing one or more APIs of that integrity level. For instance, the APIs 102 may be separated into four sets of APIs 102 based on classifications of ASIL A, ASIL B, ASIL C, or ASIL D. Accordingly, the mappings 136 may link the four sets of APIs 102 to four containers, where each container is configured to execute a different set of APIs of a different integrity level. Additionally or alternatively, the mappings 136*a-b* may indicate whether a corresponding container is compliant or noncompliant with the safety threshold 110. For example, if the computing environment 100 includes two containers, the first container 104*a* may be compliant with the safety threshold 110 while the second container 104*b* may be noncompliant with the safety threshold 110. Accordingly, the routing container 130 may use a mapping 136 of the classification table 134 to determine which container is suitable to handle the application request 132, e.g., based on the needs of the request (e.g., a particular integrity level or compliance with the safety threshold 110). In some cases, the first container 104*a* that is compliant with the safety threshold 110 may run more than one set 118 of APIs 102 that are compliant with the safety threshold 110.

Once the routing container 130 determines a suitable container to handle the application request 132, the routing container 130 can forward the application request 132 to the suitable container. For example, if the routing container 130 determines that the first container 104*a* is suitable to handle a first application request 132*a*, the routing container 130 may forward the first application request 132*a* to the first container 104*a*. Additionally or alternatively, the routing container 130 may receive a second application request 132*b* associated with the software package 108. If the routing container 130 determines that the second container 104*b* is suitable to handle the second application request 132*b*, the routing container 130 can forward the second application request 132*b* to the second container 104*b*. For example, the second container 104*b* may be suitable to handle the second application request 132*b* if the second application request 132*b* is associated with a relatively lower safety risk. In some cases, the computing environment 100 may include a router or a proxy, instead of or in addition to the routing container 130, to intercept the application requests 132*a-b* and forward the application requests 132*a-b* to the suitable container. Any suitable hardware or software may be used to route the application requests 132*a-b* to corresponding containers.

Figure 2:
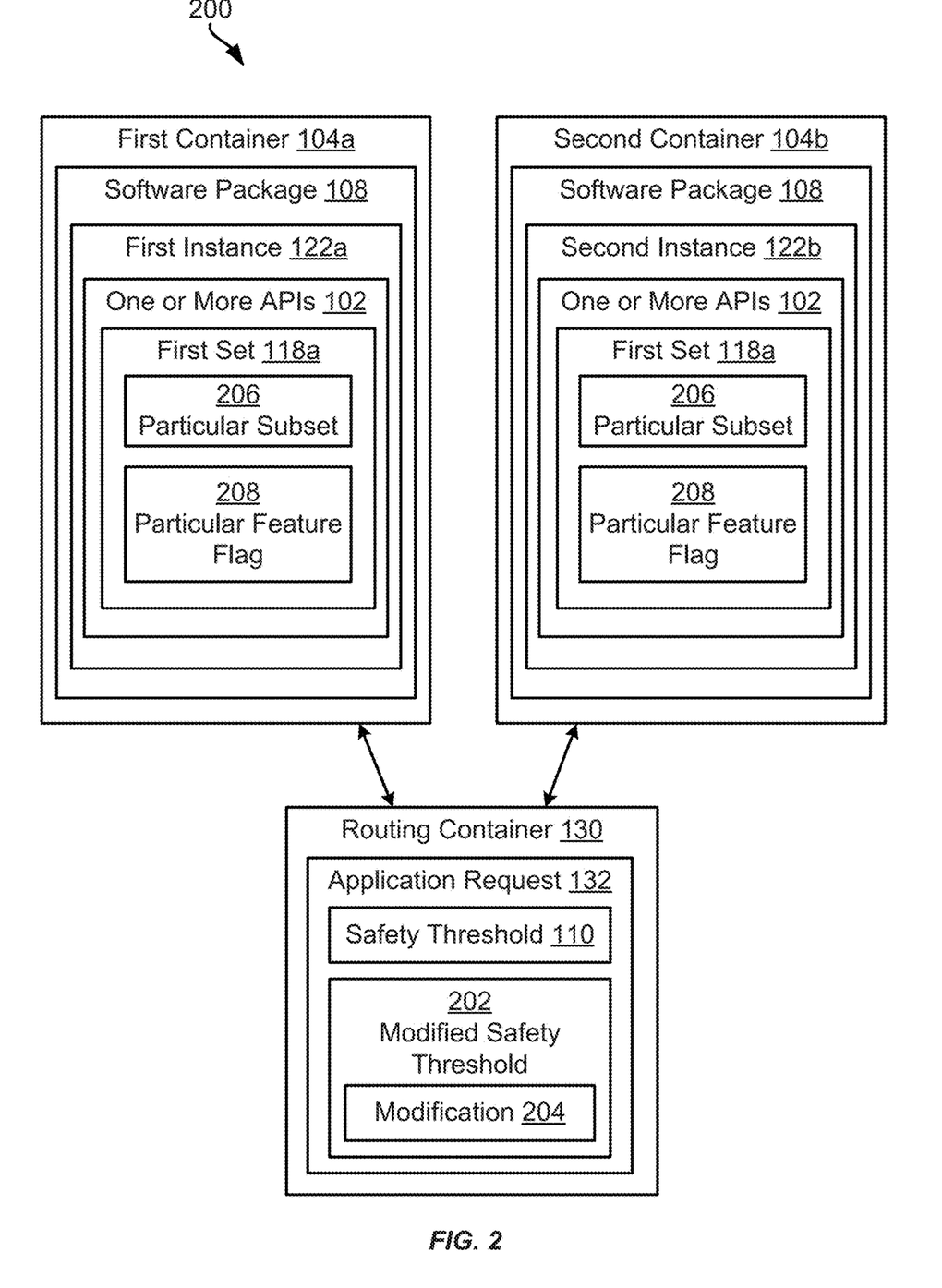
FIG. 2 is a block diagram of an example of a computing environment for modifying an instance of a software package to comply with a modified safety threshold according to some aspects of the present disclosure.

If the computing environment 100 detects a modification to the safety threshold 110, the computing environment 100 can adjust the instances 122*a-b* of the software package 108 accordingly. For example, as depicted in FIG. 2, the computing environment 200 (e.g., the computing environment 100) may determine a modified safety threshold 202, which has a modification 204 relative to the original safety threshold 110, provides greater safety assurance than the prior safety threshold 110. The computing environment 200 then can identify a particular subset 206 of the first set 118*a* of APIs 102 that is noncompliant with the modified safety threshold 202. As an example, the first set 118*a* of APIs 102 may include subsets of APIs that respectively correspond to an ASIL B classification, an ASIL C classification, or an ASIL D classification. Accordingly, the first set 118*a* of APIs 102 can be compliant with a safety threshold 110 of ASIL B. If the safety threshold 110 is elevated to a modified safety threshold 202 of an ASIL C classification, the particular subset 206 of APIs 102 may correspond to an ASIL B classification that is noncompliant with the modified safety threshold 202.

Once the computing environment 200 identifies the particular subset 206, the computing environment 200 can modify the first instance 122a of the software package 108 to comply with the modified safety threshold 202. Modifying the first instance 122a of the software package 108 can involve identifying a particular feature flag 208 associated with the particular subset 206 of APIs 102 that is noncompliant with the modified safety threshold 202. After identifying the particular feature flag 208, the computing environment 200 can disable the particular feature flag 208 to deactivate the particular subset 206 of APIs in the first instance 122a of the software package 108. Accordingly, the modified first instance of the software package 108 can be compliant with the modified safety threshold 202. The computing environment 200 additionally may modify the second instance 122b of the software package 108 deployed in the second container 104b to enable the particular feature flag 144. Thus, the second instance 122b of the software package 108 can be modified such that the particular subset 206 of APIs 102 is active.

While FIGS. 1-2 depict a specific arrangement of components, other examples can include more components, fewer components, different components, or a different arrangement of the components shown in FIGS. 1-2. For instance, in other examples, the computing environment 100 may include more than two containers (e.g., three containers, four containers, etc.) that each run a different instance of the software package 108. Additionally, any component or combination of components depicted in FIGS. 1-2 can be used to implement the process(es) described herein.

Figure 3:
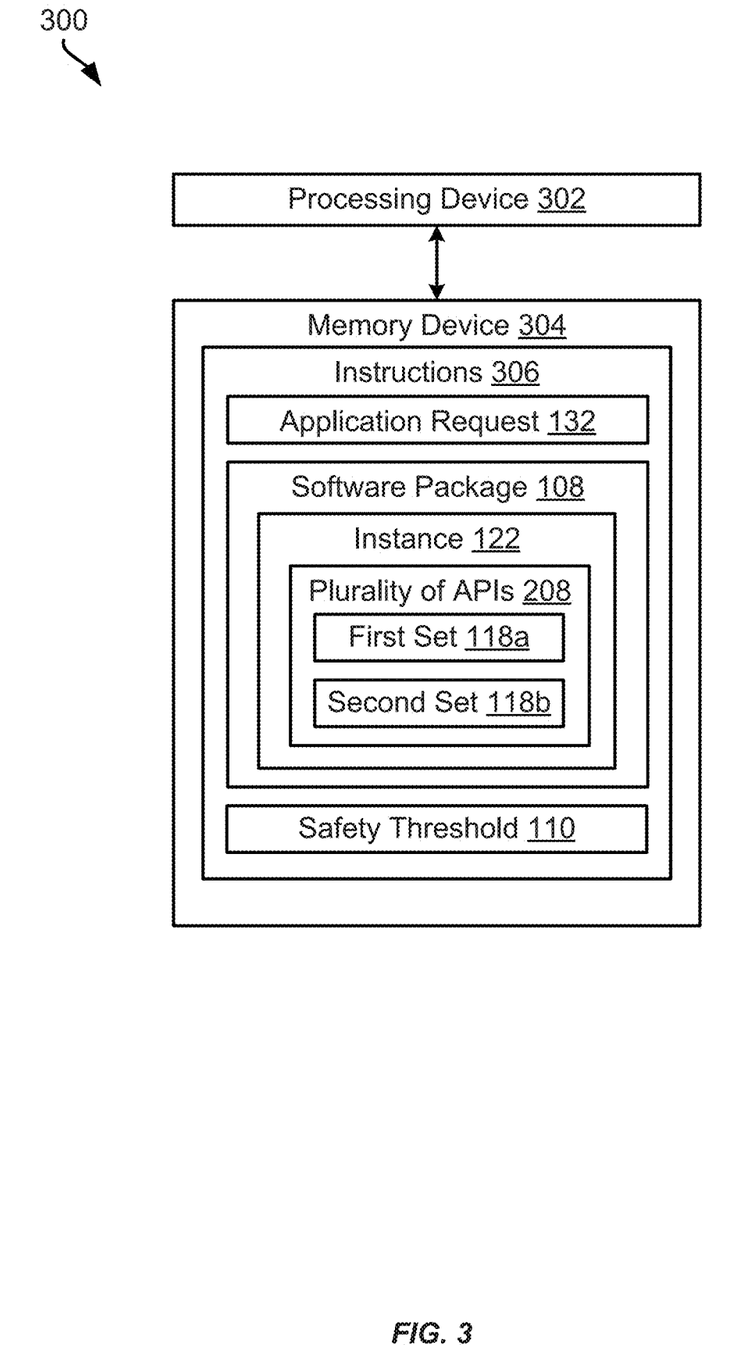
FIG. 3 is a block diagram of another example of a computing environment for separating APIs into containers to facilitate safety assurance according to some aspects of the present disclosure.

FIG. 3 is a block diagram of another example of a computing environment 300 for separating APIs 102 into containers (e.g., the containers 104a-b of FIG. 1) to facilitate safety assurance according to one example of the present disclosure. The computing environment 300 can include a processing device 302 communicatively coupled to a memory device 304.

The processing device 302 can include one processing device or multiple processing devices. The processing device 302 can be referred to as a processor. Non-limiting examples of the processing device 302 include a Field-Programmable Gate Array (FPGA), an application-specific integrated circuit (ASIC), and a microprocessor. The processing device 302 can execute instructions 306 stored in the memory device 304 to perform operations. In some examples, the instructions 306 can include processor-specific instructions generated by a compiler or an interpreter from code written in any suitable computer-programming language, such as C, C++, C#, Java, Python, or any combination of these.

The memory device 304 can include one memory device or multiple memory devices. The memory device 304 can be non-volatile and may include any type of memory device that retains stored information when powered off. Non-limiting examples of the memory device 304 include electrically erasable and programmable read-only memory (EEPROM), flash memory, or any other type of non-volatile memory. At least some of the memory device 304 includes a non-transitory computer-readable medium from which the processing device 302 can read instructions 306. A computer-readable medium can include electronic, optical, magnetic, or other storage devices capable of providing the processing device 302 with the instructions 306 or other program code. Non-limiting examples of a computer-readable medium include magnetic disk(s), memory chip(s), ROM, random-access memory (RAM), an ASIC, a configured processor, and optical storage.

In some examples, the processing device 302 can ensure a separation of concerns with respect to servicing an application request 132 using a software package 108 that includes a plurality of APIs 308. For example, once the processing device 302 receives the application request 132, the processing device 302 can determine whether the application request 132 corresponds to a first set 118a of APIs 102 or a second set 118b of APIs 102. The processing device 302 can separate the plurality of APIs 308 of the software package 108 into the first set 118a of APIs 102 that is compliant with the safety threshold 110 and the second set 118b that is noncompliant with the safety threshold 110. After determining that the application request 132 corresponds to the first set 118a, the processing device 302 can identify a container (e.g., the first container 104a of FIG. 1) that is running the first set 118a of APIs 102. For example, a feature flag mechanism, of an instance 122 of the software package 108 running in the container, can be implemented such that the first set 118a of APIs 102 is active and the second set 118b of APIs 102 is inactive. Once the processing device 302 identifies the container, the processing device 302 can forward the application request 132 to the container. The instance 122 of the software package 108 can be used by the container to handle the application request 132.

Figure 4:
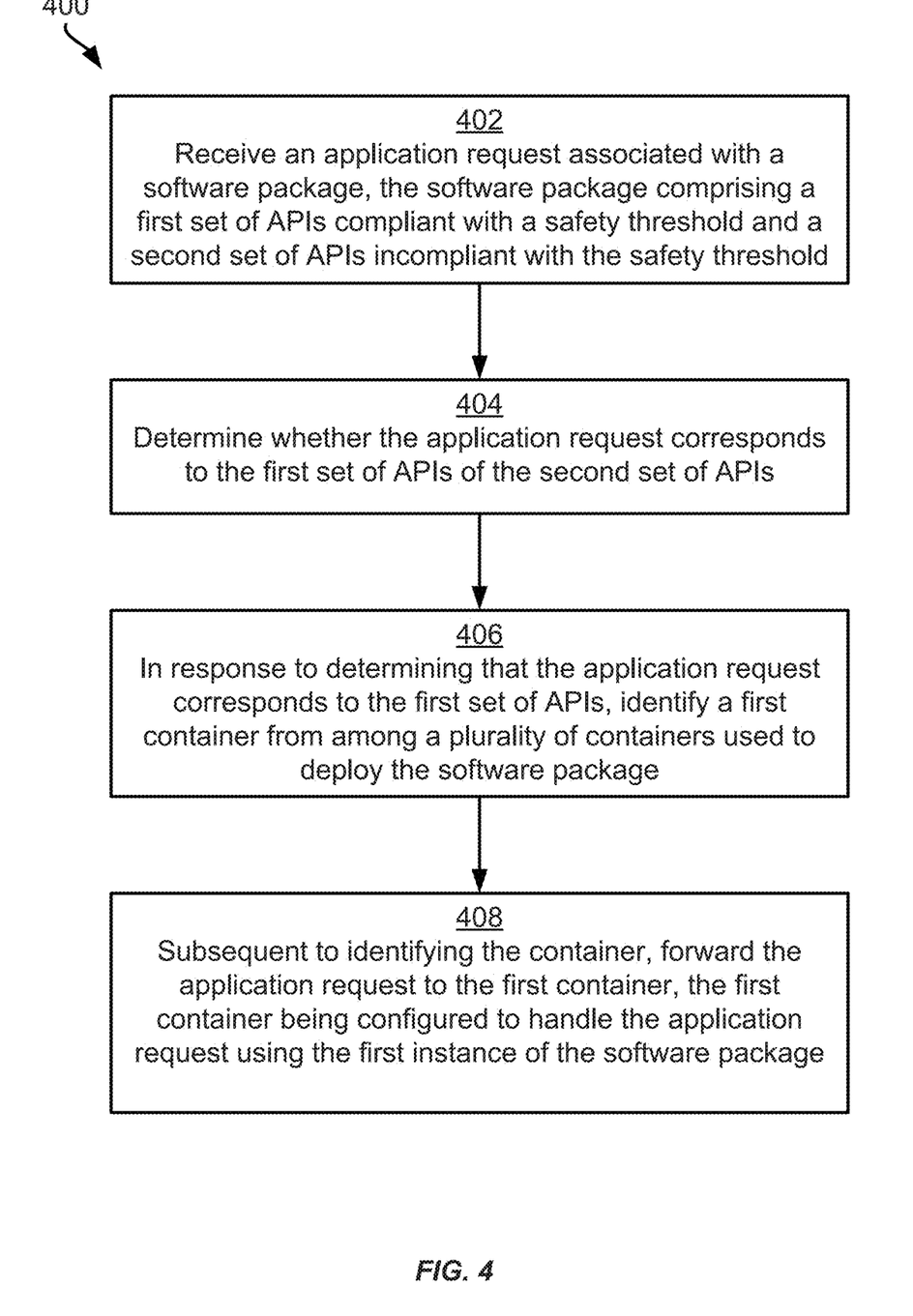
FIG. 4 is a flowchart of an example of a process for separating APIs into containers to facilitate safety assurance according to some aspects of the present disclosure.

FIG. 4 is a flowchart of a process 400 for separating APIs into containers to facilitate safety assurance according to one example of the present disclosure. In some examples, the processing device 302 can perform one or more of the steps shown in FIG. 4. In other examples, the processing device 302 can implement more steps, fewer steps, different steps, or a different order of the steps depicted in FIG. 4. The steps of FIG. 4 are described below with reference to components discussed above in FIGS. 1-3.

In block 402, the processing device 302 receives an application request 132 associated with a software package 108. The software package 108 can include a first set 118a of APIs 102 compliant with a safety threshold 110 and a second set 118b of APIs 102 noncompliant with the safety threshold 110. A rule engine 112 can be executed to use at least one rule set to separate each API of the APIs 102 into the sets 118a-b based on safety assurance of each API. For example, the processing device 302 may use the rule engine 112 to classify the APIs 102 of the software package 108 into a first set 118a associated with an ASIL C classification and a second set 118b associated with an ASIL A classification.

In block 404, the processing device 302 determines whether the application request 132 corresponds to the first set 118a of APIs 102 or the second set 118b of APIs 102. The first set 118a of APIs 102 can be associated with greater safety assurance than the second set 118b of APIs 102. For example, the ASIL C classification of the first set 118a of APIs 102 can include safety requirements of preceding levels (e.g., ASIL B and ASIL A). In some examples, the processing device 302 may determine that the application request 132 corresponds to the first set 118a of APIs 102 based on a configuration file (e.g., a specification file) or metadata transmitted with the application request 132.

In block 406, in response to determining that the application request 132 corresponds to the first set 118a of APIs 102, the processing device 302 identifies a first container 104a of one or more containers 104 used to deploy the software package 108. The first container 104a can include a first instance 122a of the software package 108 in which the first set 118a of APIs 102 is enabled and the second set 118*b* of APIs 102 is disabled. In addition to the first container 104*a*, the containers 104 can include a second container 104*b* that can include a second instance 122*b* of the software package 108. In the second instance 122*b* of the software package 108, the first set 118*a* of APIs 102 may be disabled and the second set 118*b* of APIs 102 may be enabled.

In some examples, a feature flag mechanism associated with the software package 108 can be used to deploy an instance 122 of the software package 108 that is compliant with the safety threshold 110. The processing device 302 may use the feature flag mechanism to dynamically adjust whether certain APIs of the software package are active or inactive to comply with the safety threshold 110.

In some examples, the processing device 302 can use a classification table (e.g., lookup table) to determine that the container 104 is suitable to handle the application request 132 corresponding to the first set 118*a* of APIs 102. Additionally or alternatively, the processing device 302 may execute a machine-learning model trained to use the application request 132 as an input to identify a suitable container to handle the application request 132.

In block 408, in response to identifying the container, the processing device 302 forwards the application request 132 to the container 104. In some examples, the processing device 302 may use a router, proxy, or routing container 130 to forward the application request 132 to the container 104. The container 104 can be used to handle the application request 132 using the instance 122 of the software package 108 that is compliant with the safety threshold 110.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
    a hardware processor; and
    a memory including instructions that are executable by the hardware processor for causing the hardware processor to perform operations comprising:
        deploying a first instance of a software package in a first container of a plurality of containers, a first set of application programming interfaces (APIs) activated in the first instance of the software package;
        deploying a second instance of the software package in a second container of the plurality of containers, a second set of APIs activated in the second instance of the software package, wherein the second set of APIs in the second container is isolated from the first set of APIs in the first container to prevent interference between the first set of APIs and the second set of APIs;
        receiving an application request associated with the software package, the software package comprising the first set of APIs that are compliant with a safety threshold and the second set of APIs that are noncompliant with the safety threshold;
        determining whether the application request corresponds to the first set of APIs or the second set of APIs;
        in response to determining that the application request corresponds to the first set of APIs, identifying the first container from among the plurality of containers used to deploy the software package; and
        subsequent to identifying the first container, forwarding the application request to the first container, the first container being configured to handle the application request using the first instance of the software package.

2. The system of claim 1, wherein deploying the first instance of the software package in the first container of the plurality of containers further comprises:
    determining that the first set of APIs is compliant with the safety threshold and that the second set of APIs is noncompliant with the safety threshold;
    identifying a first feature flag configured to activate the first set of APIs and a second feature flag configured to activate the second set of APIs; and
    enabling the first feature flag and disabling the second feature flag such that the first set of APIs is activated and the second set of APIs is deactivated in the first instance of the software package.

3. The system of claim 1, wherein the application request is a first application request, and wherein the operations further comprise:
    receiving a second application request associated with the software package, wherein the second application request corresponds to the second set of APIs;
    identifying the second container of the plurality of containers, wherein the first set of APIs of the second instance is inactive and the second set of APIs of the second instance is active; and
    in response to identifying the second container, forwarding the second application request to the second container, the second container configured to handle the second application request using the second instance of the software package.

4. The system of claim 1, wherein the operations further comprise:
    detecting a modification to the safety threshold, wherein the safety threshold is replaced with a modified safety threshold providing greater safety assurance than the safety threshold;
    identifying a particular subset of APIs, of the first set of APIs, that is noncompliant with the modified safety threshold; and
    modifying the first instance of the software package to comply with the modified safety threshold by disabling the particular subset of APIs.

5. The system of claim 1, wherein a routing container communicatively coupled with the plurality of containers is configured to receive the application request, and wherein the routing container uses a classification table to identify the first container from among the plurality of containers.

6. The system of claim 1, wherein identifying the first container further comprises:
    generating a classification table by executing a rule engine to classify a plurality of APIs based on one or more integrity levels, wherein the plurality of APIs includes at least the first set of APIs and the second set of APIs; and
    determining that the first instance of the software package deployed in the first container is configured to handle the application request.

7. The system of claim 1, wherein the operations further comprise:
    determining that the first container includes the first instance of the software package that is compliant with the safety threshold; and
    based on determining that the first container includes the first instance of the software package, managing a resource allocation of computing resources with respect to the first container.

8. A method comprising:

deploying a first instance of a software package in a first container of a plurality of containers, a first set of application programming interfaces (APIs) activated in the first instance of the software package;

deploying a second instance of the software package in a second container of the plurality of containers, a second set of APIs activated in the second instance of the software package, wherein the second set of APIs in the second container is isolated from the first set of APIs in the first container to prevent interference between the first set of APIs and the second set of APIs;

receiving, by a processing device, an application request associated with the software package, the software package comprising the first set of APIs compliant with a safety threshold and the second set of APIs noncompliant with the safety threshold;

determining, by the processing device, whether the application request corresponds to the first set of APIs or the second set of APIs;

in response to determining that the application request corresponds to the first set of APIs, identifying, by the processing device, the first container from among the plurality of containers used to deploy the software package; and subsequent to identifying the first container, forwarding, by the processing device, the application request to the first container, the first container being configured to handle the application request using the first instance of the software package.

9. The method of claim 8, wherein deploying the first instance of the software package in the first container of the plurality of containers further comprises:

determining that the first set of APIs is compliant with the safety threshold and that the second set of APIs is noncompliant with the safety threshold;

identifying a first feature flag configured to activate the first set of APIs and a second feature flag configured to activate the second set of APIs; and enabling the first feature flag and disabling the second feature flag such that the first set of APIs is active and the second set of APIs is inactive in the first instance of the software package.

10. The method of claim 8, wherein the application request is a first application request, and wherein the method further comprises:

receiving a second application request associated with the software package, wherein the second application request corresponds to the second set of APIs;

identifying the second container of the plurality of containers that is configured to deploy the second instance of the software package, wherein the first set of APIs of the second instance is inactive and the second set of APIs of the second instance is active; and in response to identifying the second container, forwarding the second application request to the second container, the second container configured to handle the second application request using the second instance of the software package.

11. The method of claim 8, further comprising:

detecting a modification to the safety threshold, wherein the safety threshold is replaced with a modified safety threshold providing greater safety assurance than the safety threshold;

identifying a particular subset of APIs of the first set of APIs that is noncompliant with the modified safety threshold; and modifying the first instance of the software package to comply with the modified safety threshold by:

identifying a particular feature flag corresponding to the particular subset of APIs of the first set of APIs; and disabling the particular feature flag corresponding to the particular subset of APIs.

12. The method of claim 8, wherein a routing container communicatively coupled with the plurality of containers is configured to receive the application request, and wherein the routing container uses a classification table to identify the first container from among the plurality of containers.

13. The method of claim 8, wherein identifying the first container further comprises:

generating a classification table by executing a rule engine to classify a plurality of APIs based on one or more integrity levels, wherein the plurality of APIs includes at least the first set of APIs and the second set of APIs; and determining that the first instance of the software package deployed in the first container is configured to handle the application request.

14. The method of claim 8, further comprising:

determining that the first container is configured to deploy the first instance of the software package that is compliant with the safety threshold; and subsequent to determining that the first container is configured to deploy the first instance of the software package, managing a resource allocation of computing resources with respect to the first container to prevent a malfunction of the first container.

15. A non-transitory computer-readable medium containing program code executable by a processing device for causing the processing device to perform operations comprising:

deploying a first instance of a software package in a first container of a plurality of containers, a first set of application programming interfaces (APIs) activated in the first instance of the software package;

deploying a second instance of the software package in a second container of the plurality of containers, a second set of APIs activated in the second instance of the software package, wherein the second set of APIs in the second container is isolated from the first set of APIs in the first container to prevent interference between the first set of APIs and the second set of APIs;

receiving an application request associated with the software package, the software package comprising the first set of APIs compliant with a safety threshold and the second set of APIs noncompliant with the safety threshold;

determining whether the application request corresponds to the first set of APIs or the second set of APIs;

in response to determining that the application request corresponds to the first set of APIs, identifying the first container from among the plurality of containers used to deploy the software package; and subsequent to identifying the first container, forwarding the application request to the first container, the first container being configured to handle the application request using the first instance of the software package.

16. The non-transitory computer-readable medium of claim 15, wherein deploying the first instance of the software package in the first container of the plurality of containers further comprises:
- determining that the first set of APIs is compliant with the safety threshold and that the second set of APIs is noncompliant with the safety threshold;
- identifying a first feature flag configured to activate the first set of APIs and a second feature flag configured to activate the second set of APIs; and
- enabling the first feature flag and disabling the second feature flag such that the first set of APIs is activated and the second set of APIs is deactivated in the first instance of the software package.

17. The non-transitory computer-readable medium of claim 15, wherein the application request is a first application request, and wherein the operations further comprise:
- receiving a second application request associated with the software package, wherein the second application request corresponds to the second set of APIs;
- identifying the second container of the plurality of containers that is configured to deploy the second instance of the software package, wherein the first set of APIs of the second instance is inactive and the second set of APIs of the second instance is active; and
- in response to identifying the second container, forwarding the second application request to the second container, the second container configured to handle the second application request using the second instance of the software package.

18. The non-transitory computer-readable medium of claim 15, wherein the operations further comprise:
- detecting a modification to the safety threshold, wherein the safety threshold is replaced with a modified safety threshold providing greater safety assurance than the safety threshold;
- identifying a particular subset of APIs of the first set of APIs that is noncompliant with the modified safety threshold; and
- modifying the first instance of the software package to comply with the modified safety threshold by:
  - identifying a particular feature flag corresponding to the particular subset of APIs of the first set of APIs; and
  - disabling the particular feature flag corresponding to the particular subset of APIs.

19. The non-transitory computer-readable medium of claim 15, wherein a routing container communicatively coupled with the plurality of containers is configured to receive the application request, and wherein the routing container uses a classification table to identify the first container from among the plurality of containers.

20. The non-transitory computer-readable medium of claim 15, wherein identifying the first container further comprises:
- generating a classification table by executing a rule engine to classify a plurality of APIs based on one or more integrity levels, wherein the plurality of APIs includes at least the first set of APIs and the second set of APIs; and
- determining that the first instance of the software package deployed in the first container is configured to handle the application request.

* * * * *